United States Patent
Nicolai

(10) Patent No.: US 6,170,673 B1
(45) Date of Patent: Jan. 9, 2001

(54) SWITCH CABINET WITH AN ASSEMBLY UNIT

(75) Inventor: Walter Nicolai, Buseck (DE)

(73) Assignee: Rittal-Werk Rudolf Loh GmbH & Co. KG, Herborn (DE)

( * ) Notice: Under 35 U.S.C. 154(b), the term of this patent shall be extended for 0 days.

(21) Appl. No.: 09/308,510

(22) PCT Filed: Nov. 6, 1997

(86) PCT No.: PCT/EP97/06142

§ 371 Date: May 19, 1999

§ 102(e) Date: May 19, 1999

(87) PCT Pub. No.: WO98/23004

PCT Pub. Date: Mar. 28, 1998

(30) Foreign Application Priority Data

Nov. 19, 1996 (DE) .............................. 196 47 753

(51) Int. Cl.[7] .............................. A47F 7/00; A47B 47/00
(52) U.S. Cl. .............................. 211/26; 312/264
(58) Field of Search .............................. 211/26; 361/829; 312/265, 264

(56) References Cited

U.S. PATENT DOCUMENTS

| | | | |
|---|---|---|---|
| D. 374,810 | * 10/1996 | Keijser et al. | D8/354 |
| 3,905,483 | * 9/1975 | Patrick | 211/26 X |
| 5,749,476 | * 5/1998 | Besserer et al. | 211/26 |
| 5,983,590 | * 11/1999 | Serban | 52/656.1 |

FOREIGN PATENT DOCUMENTS

| | | |
|---|---|---|
| 285 914 | 1/1953 | (CH) . |
| 19 38 879 | 2/1971 | (DE) . |
| 27 46 545 | 4/1979 | (DE) . |
| 84 29 688 | 1/1985 | (DE) . |
| 41 40 072 | 6/1993 | (DE) . |
| 44 12 462 | 10/1994 | (DE) . |
| 43 40 934 | 6/1995 | (DE) . |
| 195 03 289 | 8/1996 | (DE) . |
| 195 37 016 | 10/1996 | (DE) . |
| 2 551 303 | 3/1985 | (FR) . |
| 2 231 117 | 11/1990 | (GB) . |
| 94/14307 | 6/1994 | (WO) . |

* cited by examiner

Primary Examiner—Daniel P. Stodola
Assistant Examiner—Erica B. Harris
(74) Attorney, Agent, or Firm—Pauley Petersen Kinne & Fejer

(57) ABSTRACT

A switch cabinet having a rack with vertical frame pieces, wherein the vertical frame pieces are coupled to a lower unit or to an upper unit. Electronic components can be assembled by connecting two adjacent vertical frame pieces to a separate assembly unit with connecting elements and by fixing the components to be assembled.

14 Claims, 1 Drawing Sheet

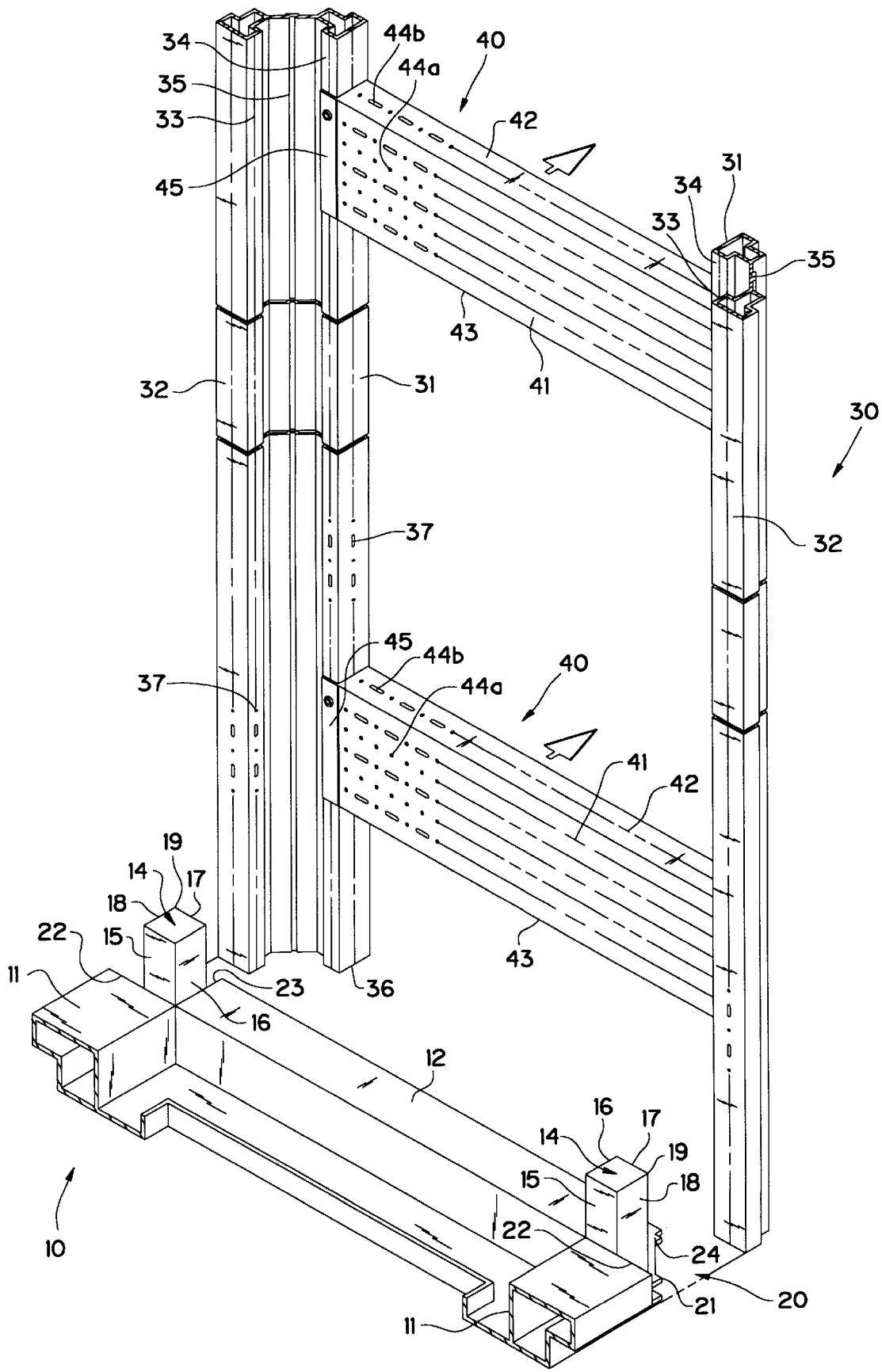

SWITCH CABINET WITH AN ASSEMBLY UNIT

BACKGROUND OF THE INVENTION

1. Field of the Invention

This invention relates to a switch cabinet with a rack having vertical frame pieces coupled to a lower unit or an upper unit.

2. Description of Prior Art

In switch cabinets, electronic components or assemblies are secured. For the attachment of these parts, a mounting plate is used. The mounting plate is placed parallel to a rear wall of the switch cabinet and is fixed at the lower unit or the upper unit.

Such a switch cabinet is known, for example, from German Patent Reference DE 41 40 072 A1. For this purpose, flanges are molded onto the lower unit. The flanges extend in a direction of the depth of the switch cabinet and accommodate glide elements made of a synthetic material. The glide elements carry the mounting plate. The mounting plate may have components and be wired outside the switch cabinet. Subsequently, the mounting plate with its glide elements is passed through an open front of the switch cabinet and placed onto the flanges. On the flanges, the mounting plate is pushed into the interior of the rack frame until it reaches its mounting position. In order to use the interior of the switch cabinet for additional built-in elements as well, the mounting plate is positioned in the majority of applications directly in front of the rear wall of the switch cabinet. For making ready the mounting plate and the flanges on which the glide elements are guided, considerable output of parts and labor is required.

SUMMARY OF THE INVENTION

It is one objective of this invention to create a switch cabinet of the initially mentioned type with which the installation of electronic components can be easily accomplished with little input.

This objective of this invention is achieved with two adjacent vertical frame pieces connected by joining pieces to form a separate mounting unit to which built-in elements can be fixed.

The vertical frame pieces, as part of the rack frame, are used for assembly of the mounting unit. With the joining pieces, the mounting unit is premounted as an assembly and may have components and be wired outside the rack. Subsequently, the rack can be completed with the mounting unit. Here, it is conceivable for a partial rack to be prefabricated as an individually adjustable unit onto which the mounting unit is built. However, it is also possible to use the mounting unit as a foundation to which the remaining parts of the rack are then connected. This invention acknowledges that in most applications, the electronic components are installed close to the side wall or the rear wall. This requirement is met with the lateral and/or the rearward portion of the rack serving directly as a mounting unit. The outlay necessary for this purpose is very small since already existing elements of the rack are used for the mounting unit. Due to the fact that the mounting unit is arranged directly at a rear wall or a side portion, the need for space is not great. The interior of the switch cabinet remains available for use.

In accordance with one embodiment of this invention, the vertical frame pieces have attachment mountings by which they are connected via corner connectors to the lower unit or the upper unit. Because the vertical frame pieces directly form the attachment mountings, the amount of parts used is kept low. No additional connection elements need to be used for attachment of the mounting unit.

The joining pieces are formed as mounting rails that have a mounting surface facing an interior space of the rack, wherein one or several side panels are connected at an angle to the mounting surface and wherein the mounting surface and the side panels have rows of attachment mountings so that the joining pieces can be used directly for mounting built-in elements. The built-in elements may be fixed to the rows of attachment mountings.

A simple attachment of the mounting unit to the lower unit and to the upper unit is possible when the lower unit and the upper unit have open receiving elements toward the outside of the rack into which the unit formed by vertical frame pieces and joining pieces can be placed.

Here, it is advantageous when the receiving elements are arranged in the corner area of the lower unit and/or the upper unit and accommodate the ends of the vertical frame pieces, wherein the receiving elements have stops which limit an insertion movement of the vertical frame pieces and wherein the insertion movement is controlled along the guide elements of the lower unit and the upper unit and/or the vertical frame pieces. By way of the guide elements, it is also possible to easily introduce a mounting unit, having components and therefore heavy, into the receiving elements. The stops secure the mounting unit in the designated position. The mounting unit can then be permanently connected with the lower unit and the upper unit by fastening elements.

If a projection is formed by the lower unit and/or the upper unit which covers the front face of the vertical frame piece at least partially, then the vertical frame piece is also guided at its two ends and secured in the receiving element.

In a preferred embodiment of this invention, the vertical frame pieces have a groove facing the interior of the rack and extending in the longitudinal direction. The corner connectors are accommodated inside the groove and the vertical frame pieces are connected in a releasable or non-releasable manner with the corner connectors. For the releasable connection, it is conceivable that the vertical frame pieces be screwed together with the corner connectors. For the unreleasable connection, a welding process may be used. The corner connector serves, for one purpose, tying the vertical frame pieces to the lower unit and the upper unit. Also, the corner connector can, depending on how far it extends into the groove, serve as a reinforcement element.

In another preferred embodiment of this invention, the mounting unit carries one or several cladding elements for covering a rearward side of the mounting unit or of the interior of the rack frame. The cladding element may rest as a flat plate against a rear surface of the vertical frame pieces. However, it is also conceivable that the cladding element bulges out, so that an installation or cable chamber is created.

A multitude of attachment possibilities at the mounting unit is created in a simple manner when the vertical frame pieces show profiled sides in pairs with which two or several mounting planes are formed which are parallel to each other.

BRIEF DESCRIPTION OF THE DRAWINGS

In the following text, this invention is explained in greater detail by means of an example shown in the drawing. The drawing shows in a partial perspective view a lower unit of a rack for a switch cabinet and a vertical mounting unit.

DESCRIPTION OF PREFERRED EMBODIMENTS

A lower unit (10) is constructed from horizontal depth and longitudinal struts (11 and 12) equal in cross-section and connected with each other at their ends, so that a closed frame is created. In corner areas of the lower unit (10) receiving elements (20), which are open to the outside, are formed into which corner connectors (14) are placed. The corner connectors (14) are in a form of cuboid elements which are placed onto a plate-like projection (24) constructed as a floor surface. The plate-like projection (24) is connected in one piece with the lower unit (10). The corner connector (14) forms contact surfaces (15 and 16) at two sides which correspond to the longitudinal and depth struts (11 and 12). With the contact surfaces (15 and 16), the corner connector (14) is placed flush with the front faces of the longitudinal and depth struts (11 and 12). The corner connector (14) is welded to the lower unit (10). Here, welding seams extend along the contact surfaces (15 and 16) in an area of the projection (24) of the lower unit (10). However, it is also conceivable that the corner connector (14) be connected by screws with the lower unit (10) and thereby be exchangeable. The two sides of the corner connector (14), which face away from the contact surfaces (15 and 16), are formed as guide elements (17 and 18). The guide elements (17 and 18) accommodate the mounting unit. The mounting unit is formed essentially from two vertical frame pieces (30) and connecting joining pieces (40).

The frame pieces (30) are in a form of closed hollow profiles having an attachment mounting (35) facing toward an inside of the rack. The attachment mounting (35) is formed as an undercut dovetail groove. Laterally, centering devices (33, 34) lock onto the attachment mounting (35). The centering devices (33, 34) are at a right angle to each other and have rows of attachment mountings (37). The attachment mountings (37) are arranged at equal distances from each other and are in the form of a slot and a hole alternately arranged. The two guide elements (33, 34) transition into profiled sides (31, 32). The profiled sides (31, 32) are perpendicular with respect to the assigned outsides of the rack. The two joining pieces (40) are in the form of mounting rails formed with a U-shaped cross-section from a mounting surface (41) and two connected side panels (42, 43). The side panels (42, 43) are parallel to each other. The mounting surface (41) faces the interior of the rack. Laterally, to the front face of the mounting surface (41), an attachment section (45) is connected. The attachment section (45) is in the form of a flap partially covering a designated centering device (34). As indicated in the drawing, via the attachment section (45), the joining piece (40) can be screwed together with the vertical frame pieces (30). To the joining pieces (40), electronic assemblies can be fixed. For this purpose, attachment mountings (44a, 44b) are provided in the mounting surface (41) and the side panels (42, 43). The attachment mountings (44a, 44b) are arranged in lines and are equally spaced with respect to each other. The spacing is selected to correspond with the spacing of the attachment mountings (37) of the vertical frame pieces (30). With the mounting unit shown in the drawing, in the upper area and in the lower area of the vertical frame pieces (30), joining pieces (40) are provided. However, it is also possible to use more than two joining pieces (40) in order to form a mounting unit. In particular, cross-struts may also be used which are placed diagonally between the two vertical frame pieces (30). For the purpose of attaching the mounting unit to the lower unit (10) it is pushed in its vertical adjustment position into the receiving element (20). Here, at first the vertical frame pieces (30) are placed with their front faces (36) on the projection (24) of the lower unit (10). Subsequently, the complete mounting unit is pushed into the receiving element (20) in the direction opposite that of the arrows shown in the drawing. At that point, the centering devices (33) of the vertical frame pieces (30) glide the guide elements (18) of the corner connector (14). The insertion movement is limited by the profiled sides (32) which come to rest against front faces of the depth struts (11) which are in the form of stops (22). Simultaneously, the centering device (34) abuts against the guide element (17). Between the two guide elements (17 and 18) of the corner connector (14), there is a sloping flank (19) which projects into the attachment mounting (35) of the vertical frame pieces. Between the flank (19) and the lower surface of the attachment mounting (35), a free space is formed where the vertical frame pieces (30) always rest only with their centering devices (33, 34) against the guide elements (17, 18). Thus, the mounting unit can be aligned precisely at the lower unit (10). In order to secure it, the mounting unit is screwed together with the lower unit (10). For that purpose, screw-receiving elements, not shown in the drawing, are provided in the corner connectors (14) and the floor surface of the attachment mounting (35) of the vertical frame pieces (30). Through these, attachment screws can be passed and countered by a nut or may be screwed into a threading of the corner connector (14). However, it is also possible to directly weld the vertical frame pieces (30) to the lower unit (10) and the corner connector (14).

In addition to the lower unit (10), advantageously, a structurally similar upper unit may be tied in the upper area to the vertical frame pieces (30). With additional vertical frame pieces (30), the rack can then be completed. The mounting unit is advantageously arranged at the rear of the switch cabinet. However, it is also possible to provide the mounting unit at a sidewall. With the mounting unit, a multitude of attachment possibilities is given. In particular, the profiled sides (32) or the centering devices (34) of the vertical frame pieces (30), which are assigned to each other in pairs, can be used for forming two mounting planes offset parallel to each other. In the drawing, the first mounting plane is partially formed by the mounting surfaces (41) of the joining pieces (40). Such offset mounting planes may also be arranged inside the rack so that they are perpendicular with respect to the mounting unit. For this purpose, attachment mountings (37) of the profiled side (31) or of the centering device (33) are used.

In order to avoid the danger of injury, the sections (24) of the receiving elements (20) have a profiling (21) adapted to an outer geometry of the vertical frame pieces (30). In this way, no edges of the lower unit (10) protrude beyond the vertical frame pieces (30). If the mounting unit is to be permanently connected with the lower unit (10), then it is possible to place a welding seam along the profiling (21).

What is claimed is:

1. In a switch cabinet having a rack with vertical frame pieces connected to one of a lower unit and an upper unit, the improvement comprising: two adjacent vertical frame pieces (30) combined by joining pieces (40) to form a separate mounting unit on which a plurality of built-in elements can be secured, the joining pieces (40) formed as mounting rails having a mounting surface (41) facing an interior of the rack, at least one side panel (42, 43) connected to the mounting surface (41) at an angle and the mounting surface (41) and the at least one side panel (42, 43) having a plurality of rows of attachment mountings (44a, 44b), each of the vertical frame pieces (30) having a dovetail groove (35), a plurality of corner connectors (14) connected to the lower unit, and each of the corner connectors (14) having a flank (19) projecting into the dovetail groove (35).

2. In the switch cabinet in accordance with claim 1, wherein at least one of the lower unit and the upper unit (10)

has a plurality of receiving elements (20) open toward an outside of the rack and onto which an unit formed from vertical frame pieces (30) and joining pieces (40) is placed.

3. In the switch cabinet in accordance with claim 2, wherein the receiving elements (20) are arranged in a corner area of at least one of the lower unit and the upper unit (10) and accommodate ends of the vertical frame pieces (30), the receiving elements (20) have a plurality of stops (22, 23) which limit an insertion movement of the vertical frame pieces (30) and the insertion movement is controlled at guide elements (17, 18) of at least one of the lower unit, the upper unit (10) and the vertical frame pieces (30).

4. In the switch cabinet in accordance with claim 1, wherein at least one of the lower unit and the upper unit (10) has a plurality of receiving elements (20) open toward an outside of the rack and onto which an unit formed from vertical frame pieces (30) and joining pieces (40) is placed.

5. In a switch cabinet in accordance with claim 4, wherein the at least one of the lower unit and the upper unit (10) forms a projection (24) which at least partially covers a front face (36) of the vertical frame pieces (30).

6. In the switch cabinet in accordance with claim 4, wherein the receiving elements (20) are arranged in a corner area of at least one of the lower unit and the upper unit (10) and accommodate ends of the vertical frame pieces (30), the receiving elements (20) have a plurality of stops (22, 23) which limit an insertion movement of the vertical frame pieces (30) and the insertion movement is controlled at guide elements (17, 18) of at least one of the lower unit, the upper unit (10) and the vertical frame pieces (30).

7. In a switch cabinet in accordance with claim 6, wherein the at least one of the lower unit and the upper unit (10) forms a projection (24) which at least partially covers a front face (36) of the vertical frame pieces (30).

8. In a switch cabinet in accordance with claim 7 wherein the vertical frame pieces (30) have a longitudinally extending groove facing the interior of the rack, corner connector (14) is accommodated in the groove and the vertical frame pieces (30) can be connected with the corner connectors (14).

9. In a switch cabinet in accordance with claim 8, wherein the at least one of the lower unit and the upper unit (10) is connected by screw connections to the vertical frame pieces (30).

10. In a switch cabinet in accordance with claim 9, wherein the vertical frame pieces (30) have profiled sides (32—32 and 34—34) arranged in pairs with respect to each other with which at least two extending mounting planes are formed which are parallel to one another.

11. In a switch cabinet in accordance with claim 1, wherein the at least one of the lower unit and the upper unit (10) is connected by screw connections to the vertical frame pieces (30).

12. In a switch cabinet in accordance with claim 1, wherein the vertical frame pieces (30) have profiled sides (32—32 and 34—34) arranged in pairs with respect to each other with which at least two extending mounting planes are formed which are parallel to one another.

13. In a switch cabinet having a rack with vertical frame pieces connected to one of a lower unit and an upper unit, the improvement comprising, two adjacent vertical frame pieces (30) combined by joining pieces (40) to form a separate mounting unit on which a plurality of built-in elements can be secured, the vertical frame pieces (30) each having a longitudinally extending groove facing an interior of the rack, a corner connector (14) accommodated in the groove and one of the vertical frame pieces (30) connected with the corner connector (14) with a flank (19) of the corner connector (14) projecting into a dovetail groove (35) of the one of the vertical frame pieces (30).

14. In a switch cabinet in accordance with claim 13 wherein the corner connector (14) is in a form of a cuboid element.

* * * * *